(12) United States Patent
Garrec et al.

(10) Patent No.: US 11,353,095 B2
(45) Date of Patent: Jun. 7, 2022

(54) TRANSMISSION FOR CABLE CYLINDER WITH OFFSET NUT ANCHORAGE

(71) Applicant: COMMISSARIAT A L'ENERGIE ATOMIQUE ET AUX ENERGIES ALTERNATIVES, Paris (FR)

(72) Inventors: Philippe Garrec, Gif-sur-Yvette (FR); Benoit Perochon, Guyancourt (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/297,899

(22) PCT Filed: Dec. 23, 2019

(86) PCT No.: PCT/EP2019/086983
§ 371 (c)(1),
(2) Date: May 27, 2021

(87) PCT Pub. No.: WO2020/136185
PCT Pub. Date: Jul. 2, 2020

(65) Prior Publication Data
US 2022/0018424 A1     Jan. 20, 2022

(30) Foreign Application Priority Data
Dec. 27, 2018   (FR) ...................................... 1874228

(51) Int. Cl.
*F16H 25/20*     (2006.01)
(52) U.S. Cl.
CPC ..... *F16H 25/20* (2013.01); *F16H 2025/2075* (2013.01); *F16H 2025/2096* (2013.01)
(58) Field of Classification Search
CPC ............. F16H 25/20; F16H 2025/2075; F16H 2025/2096
See application file for complete search history.

(56) References Cited

U.S. PATENT DOCUMENTS

| 4,547,119 A | 10/1985 | Chance et al. |
| 2006/0169086 A1* | 8/2006 | Garrec .................... F16H 19/06 74/490.03 |

(Continued)

FOREIGN PATENT DOCUMENTS

| WO | 2014/128178 A1 | 8/2014 |
| WO | 2014/161796 A1 | 10/2014 |

OTHER PUBLICATIONS

International Search Report for PCT/EP2019/086983 dated May 25, 2020 (PCT/ISA/210).

*Primary Examiner* — David M Fenstermacher (57) ABSTRACT

An actuator (100) comprising:
a frame (20);
a screw (2) mounted on the frame;
a nut (4) co-operating with the screw (2);
a motor (3) arranged to drive the screw (2) in rotation;
a first cable strand (6.1) and a second cable strand (9.1) coupled to the nut (4) and extending on a first side (8.1) of a first plane (P1);
a third cable strand (6.4) and a fourth cable strand (9.4) coupled to the nut (4) and extending on a second side (8.2) of the first plane (P1);
the first cable strand (6.1) and the second cable strand (9.1) extending in a second plane (P2);
the third cable strand (6.4) and the fourth cable strand (9.4) extending in a third plane (P3); and
the second plane (P2) and the third plane (P3) being distinct.

24 Claims, 11 Drawing Sheets

(56) References Cited

U.S. PATENT DOCUMENTS

| | | | |
|---|---|---|---|
| 2006/0191362 A1* | 8/2006 | Garrec | F16H 19/06 74/89.34 |
| 2010/0072123 A1* | 3/2010 | Haslem | G01D 5/145 210/232 |
| 2011/0056321 A1 | 3/2011 | Sim et al. | |
| 2014/0245846 A1* | 9/2014 | Garrec | F16H 19/06 74/89.32 |
| 2015/0096392 A1* | 4/2015 | Garrec | F16C 1/06 74/89.23 |
| 2016/0288319 A1* | 10/2016 | Kfoury | F16H 19/0622 |
| 2017/0009857 A1* | 1/2017 | Garrec | F16H 19/06 |
| 2020/0300325 A1* | 9/2020 | Vine | G05D 15/01 |
| 2021/0037967 A1* | 2/2021 | Qiu | A47B 97/00 |
| 2021/0262876 A1* | 8/2021 | Garrec | G01L 1/00 |
| 2022/0018424 A1* | 1/2022 | Garrec | F16H 25/20 |
| 2022/0022976 A1* | 1/2022 | Beckman | B25J 13/02 |

\* cited by examiner

TRANSMISSION FOR CABLE CYLINDER WITH OFFSET NUT ANCHORAGE

CROSS REFERENCE TO RELATED APPLICATIONS

This application is a National Stage of International Application No. PCT/EP2019/086983 filed Dec. 23, 2019, claiming priority based on French Patent Application No. 1874228 filed Dec. 27, 2018.

FIELD OF THE INVENTION

The invention relates to a cable actuator including a screw-and-nut assembly in which the nut is movable in translation and is coupled by means of cables to an element that is to be moved.

BACKGROUND OF THE INVENTION

Cable actuators are known that comprise a screw mounted on a frame and a nut co-operating with the screw. The nut is associated with antirotation means comprising a wheel or a stud secured to the nut and mounted to slide in a groove of the frame so that relative rotation between the screw and the nut causes the screw to be moved axially.

The nut is functionally connected to an element that is to be moved by means of two cable strands extending on opposite sides of a plane containing the nut and orthogonal to the axis of rotation of the screw. In order to distribute loads symmetrically, both cable strands are connected to the nut at the same point. This type of connection is made by crimping both cable strands at a single point. Particularly in cable actuators of small size, a connection of this type is awkward to make and to undo, and it is likely that the nut or the screw will be damaged while the crimping tool is being used or while the crimp is being cut. Also, in order to avoid backlash between the crimp and the nut when reversing force direction, it is necessary to add a system for blocking the crimp by means of prestress, thereby making assembly much more complicated and difficult to perform on a small scale. Operations of manufacturing, inspecting, and maintaining such a cable actuator are thus lengthy and expensive, which puts a brake on solutions including a cable actuator becoming widespread, even though actuators of this type provide numerous advantages including proportional and reversible transmission of force, low inertia, and a very advantageous ratio of compactness to stroke.

OBJECT OF THE INVENTION

An object of the invention is to reduce the costs of manufacturing and/or maintaining a cable actuator.

SUMMARY OF THE INVENTION

To this end, there is provided a cable actuator comprising a frame, a screw mounted on the frame and extending along a first axis, a nut co-operating with the screw, and a motor arranged to drive the screw in rotation. A first cable strand and a second cable strand are coupled directly to the nut and extend on a first side of a first plane orthogonal to the first axis and containing the nut, the first cable strand and the second cable strand extending in a second plane. A third cable strand and a fourth cable strand are coupled directly to the nut and extend on a second side of the first plane. The first cable strand and the second cable strand extend in a second plane, and the third cable strand and the fourth cable strand extend in a third plane. The first plane subdivides the second plane into a first half-plane in which the first cable strand and the second cable strand extend, and into a second half-plane not having any cable strands that are directly connected to the nut. The first plane subdivides the third plane into a third half-plane in which the third cable strand and the fourth cable strand extend, and into a fourth half-plane not having any cable strands that are directly connected to the nut. The first cable strand and/or the second cable strand and/or the third cable strand and/or the fourth cable strand are functionally connected to an element that is to be moved. The second plane and the third plane are distinct.

The second plane and the third plane are distinct, and the first cable strand, the second cable strand, the third cable strand, and the fourth cable strand can be connected easily to the nut by means of a crimp blocked against a hole in the nut. Undoing such connections is likewise particularly easy and without any risk of damaging the nut.

The cost of manufacturing of the actuator is further reduced when the nut has a plurality of first holes, and the first cable strand and/or the second cable strand and/or the third cable strand and/or the fourth cable strand are coupled to the nut by at least one segment passing through a pair of first holes. The reliability of the connection is further improved when the first cable strand and the second cable strand or the third cable strand or the fourth cable strand form a single first continuous cable.

The forces in the cables are distributed uniformly when the first axis extends in the second and/or the third plane or indeed when the second plane and the third plane are orthogonal, or even when the second plane and the third plane form an angle of 60°.

A rotary output actuator is obtained when the actuator includes a first pulley, a second pulley, a third pulley, and a fourth pulley that are functionally connected to the nut.

Horizontal and/or vertical tilting of the nut is compensated when the first cable strand and the second cable strand extend between the nut and a first intermediate support that is connected to the element that is to be moved functionally by means of a fifth cable strand and of a sixth cable strand.

A rotary output actuator is obtained when the fifth cable strand extends between the first pulley and the first intermediate support, and the sixth cable strand extends between the second pulley and the first intermediate support.

The connection to the first support is made inexpensively when the first support includes a plurality of second holes, the first cable strand and/or the second cable strand is/are coupled to the first support by at least one segment passing through a pair of second holes or indeed the fifth cable strand and/or the sixth cable strand is/are coupled to the first support by at least one segment passing through a pair of second holes.

Advantageously, the fifth cable strand and the sixth cable strand extend in a fourth plane, and the fourth plane and the second plane form an angle of 45° or of 60°.

Horizontal and/or vertical tilting of the nut is compensated when the third cable strand and the fourth cable strand extend between the nut and a second intermediate support that is functionally connected to the element that is to be moved.

A rotary output actuator is obtained when a seventh cable strand extends between the third pulley and the second intermediate support, and an eighth cable strand extends between the fourth pulley and the second intermediate support.

The connection to the first support is made inexpensively when the second support includes a plurality of third holes, and the third cable strand and/or the fourth cable strand is/are coupled to the second support by at least one segment passing through a pair of third holes or indeed the second support includes a plurality of third holes, and the seventh cable strand and/or the eighth cable strand is/are coupled to the second support by at least one segment passing through a pair of third holes.

Advantageously, the seventh cable strand and the eighth cable strand extend in a fifth plane and/or the fifth plane and the third plane form an angle of 45° or of 60°.

The connection to the first support is made inexpensively the third cable strand and the seventh cable strand or the eighth cable strand form a single continuous cable.

In a preferred embodiment, the third cable strand and the fourth cable strand extend between the nut and a second intermediate support that is functionally connected to the element that is to be moved, the cable actuator including a first pulley and a second pulley connected respectively by a fifth cable strand and by a sixth cable strand to the first intermediate support, and also a third pulley and a fourth pulley connected respectively by a seventh cable strand and by an eighth cable strand to the second intermediate support, the fifth cable strand and the sixth cable strand extending in a fourth plane, the seventh cable strand and the eighth cable strand extending in a fifth plane. The nut includes a plurality of first holes, the first support includes a plurality of second holes, the second support includes a plurality of third holes, the first cable strand, the second cable strand, the third cable strand, the fourth cable strand, the fifth cable strand, the sixth cable strand, the seventh cable strand, and the eighth cable strand form a single continuous cable coupled to the nut by at least one segment passing through a pair of first holes, the single cable also being coupled to the first support by at least one segment passing through a pair of second holes, the single cable also being coupled to the second support by at least one segment passing through a pair of third holes.

Also advantageously, the first cable strand and/or the second cable strand and/or the third cable strand and/or the fourth cable strand is/are coupled to the nut by crimping.

Functional clearances are smaller and the linearity of the actuator is improved when at least one of the cable strands is preloaded.

The compactness of the device is further improved when a first distance between the first cable strand and the first axis is different from a second distance between the third cable strand and/or the fourth cable strand and the first axis.

Other characteristics and advantages of the invention appear on reading the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
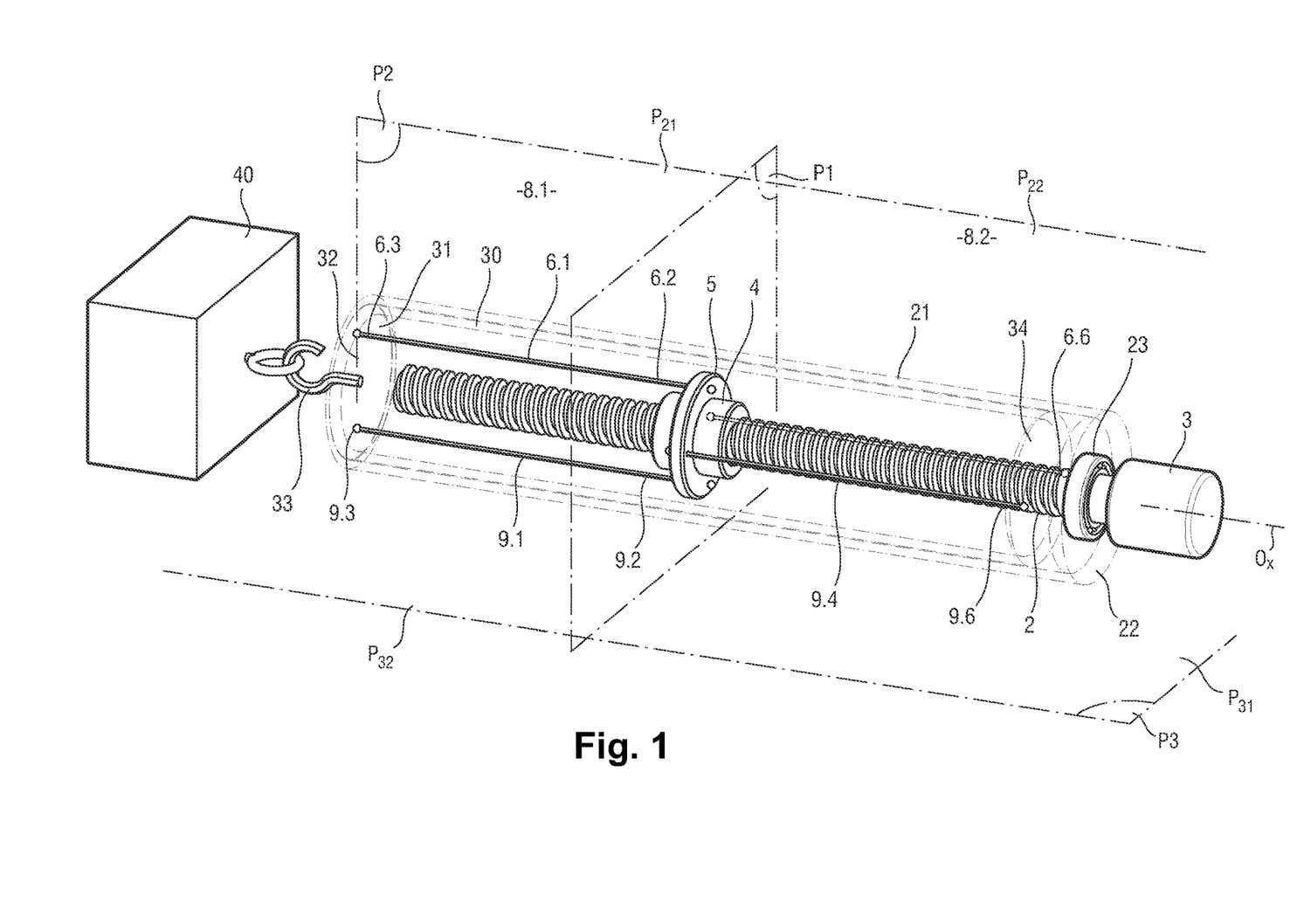
FIG. 1 is a perspective view of a cable actuator in a first embodiment of the invention.

With reference to FIG. 1, the actuator of the invention, given overall reference 100, comprises a frame 20, in this example a portion of a right cylinder 21 including a base 22 having a bearing 23 at its center that receives a screw 2 to rotate about a horizontal first axis Ox. The screw 2 is a ball screw and it is driven in rotation by an electric motor 3. A nut 4 co-operates with the screw 2 and includes a ring 5 projecting radially from the nut 4. A first cable strand 6.1 extends parallel to the first axis Ox and is engaged through a first hole 10 in the ring 5. At its first end 6.2, the first cable strand 6.1 has a first crimp 7.1 that bears against a first face 5.1 of the ring 5. A second cable strand 9.1 extends parallel to the first axis Ox and is engaged through a second hole 11 in the ring 5. At its first end 9.2, the second cable strand 9.1 is held against the ring 5 by a second crimp 7.2 to bear against the first face 5.1 of the ring 5. The second end 6.3 of the first cable strand 6.1 and the second end 9.3 of the second cable strand 9.1 are both connected to the first end 31 of a tube 30 mounted inside the cylinder 21 to form a slideway connection by means known the person skilled in the art and not shown. The first end 31 of the tube 30 has a first transverse face 32 provided with a hook 33 that is connected to a load 40 that is to be moved. The first cable strand 6.1 and the second cable strand 9.1 both extend on a first side 8.1 of a first plane P1 that is orthogonal to the first axis Ox and that contains the nut 4. The first cable strand 6.1 and the second cable strand 9.1 extend on opposite sides of the first axis Ox in a second plane P2.

A third cable strand 6.4 extends parallel to the first axis Ox and is engaged through a third hole 12 in the ring 5. At its first end 6.5, the third cable strand 6.4 has a third crimp 7.3 that comes to bear against a second face 5.2 of the ring 5. A fourth cable strand 9.4 extends parallel to the first axis Ox and is engaged through a fourth hole 13 in the ring 5. At its first end 9.5, the fourth cable strand 9.4 has a fourth crimp 7.4 that comes to bear against the second face 5.2 of the ring 5. The second end 6.6 of the third cable strand 6.4 and the second end 9.6 of the fourth cable strand 9.4 are connected to the second transverse face 34 of the tube 30.

The third cable strand 6.4 and the fourth cable strand 9.4 extend on a second side 8.2 of the first plane P1. The third cable strand 6.4 and the fourth cable strand 9.4 extend on opposite sides of the first axis Ox in a third plane P3 that is orthogonal to the second plane P2.

The first plane P1 thus subdivides the second plane P2 into a first half-plane P21 situated on the first side 8.1 of the plane P1, and into a second half-plane P22 situated on the second side 8.2 of the plane P1. The first plane P1 also subdivides the third plane P3 into a third half-plane P31 situated on the second side 8.2 of the plane P1, and into a fourth half-plane P32 situated on the first side 8.1 of the plane P1.

Figure 2:
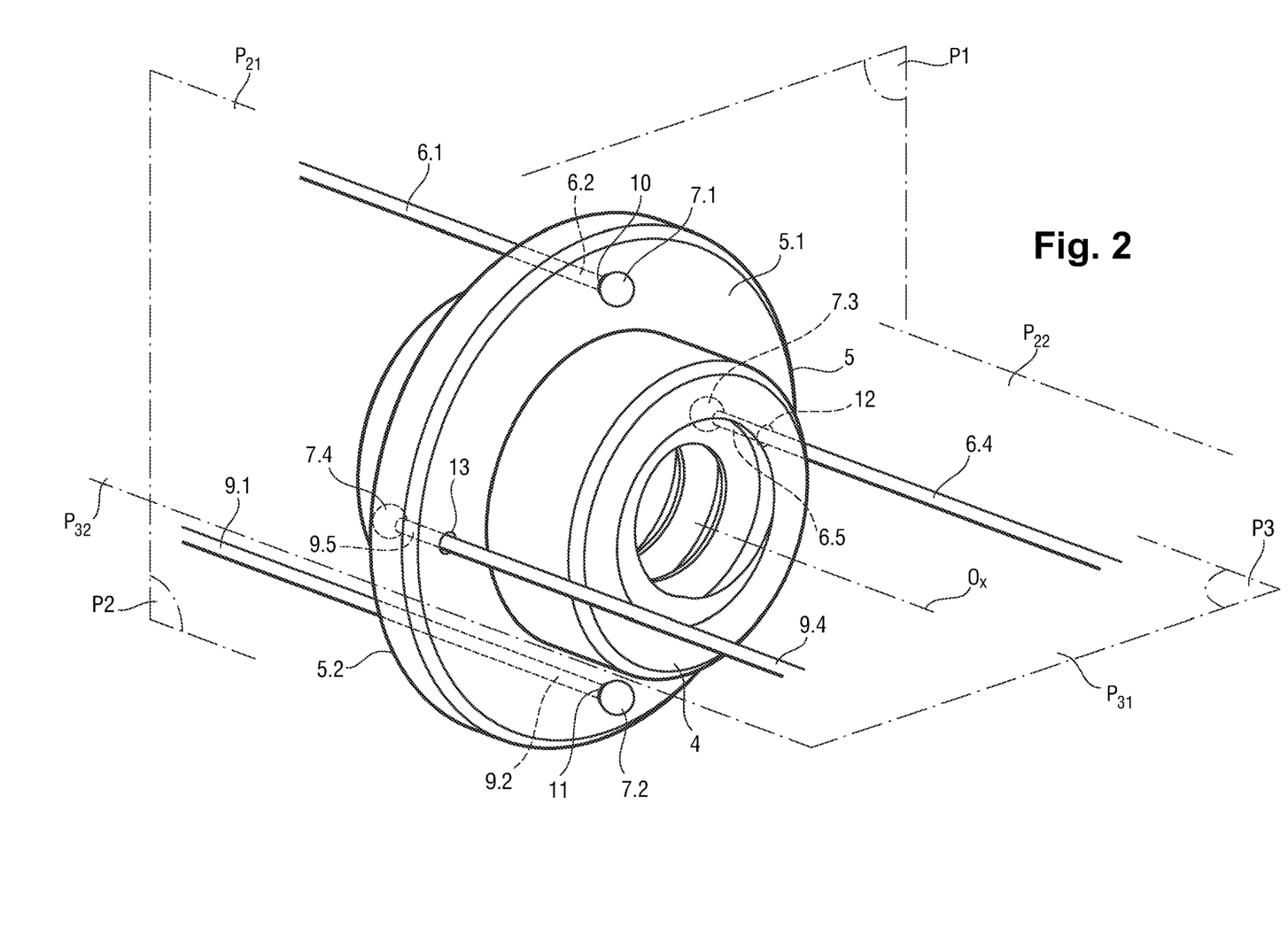
FIG. 2 is a fragmentary diagrammatic view in perspective of a detail of FIG. 1.

As can be seen in FIGS. 1 and 2, the first cable strand 6.1 and the second cable strand 9.1 extend in the first half-plane P21, and the second half-plane P22 does not have any cable strands that are connected directly to the nut 4. In corresponding manner, the third cable strand 6.4 and the fourth cable strand 9.4 extend in the third half-plane P31, and the fourth half-plane P32 does not have any cable strands that are directly connected to the nut 4.

In operation, under drive from the motor 3, rotation of the screw 2 gives rise to identical rotation of the nut 4 as a result of contact friction between the screw 2 and the nut 4. This movement puts all of the first cable strand 6.1, the second cable strand 9.1, the third cable strand 6.4, and the fourth cable strand 9.4 under tension, which cable strands then exert forces opposing the nut 4 being driven in rotation by the screw 2. In addition to their functions of transmitting movement forces to the load 40, the first cable strand 6.1, the second cable strand 9.1, the third cable strand 6.4, and the fourth cable strand 9.4 act together to perform an antirotation function such that rotation of the screw 2 under drive from the motor 3 causes the nut 4 to move relative to the screw 2. The way the cable strands are arranged allows the nut 4 to tilt a little both horizontally and vertically (as shown in FIG. 1).

Since the second plane P2 and the third plane P3 are distinct, the first cable strand 6.1, the second cable strand 9.1, the third cable strand 6.4, and the fourth cable strand 9.4 can all be connected easily to the nut 4 by means of a crimp blocked against a hole in the nut 4. Undoing such connections is likewise particularly easy and without any risk of damaging the nut 4.

Elements that are identical or analogous to those described above are given identical numerical references in the following description of the second, third, fourth, fifth, sixth, seventh, eighth, ninth, tenth, and eleventh embodiments of the invention.

Figure 3:
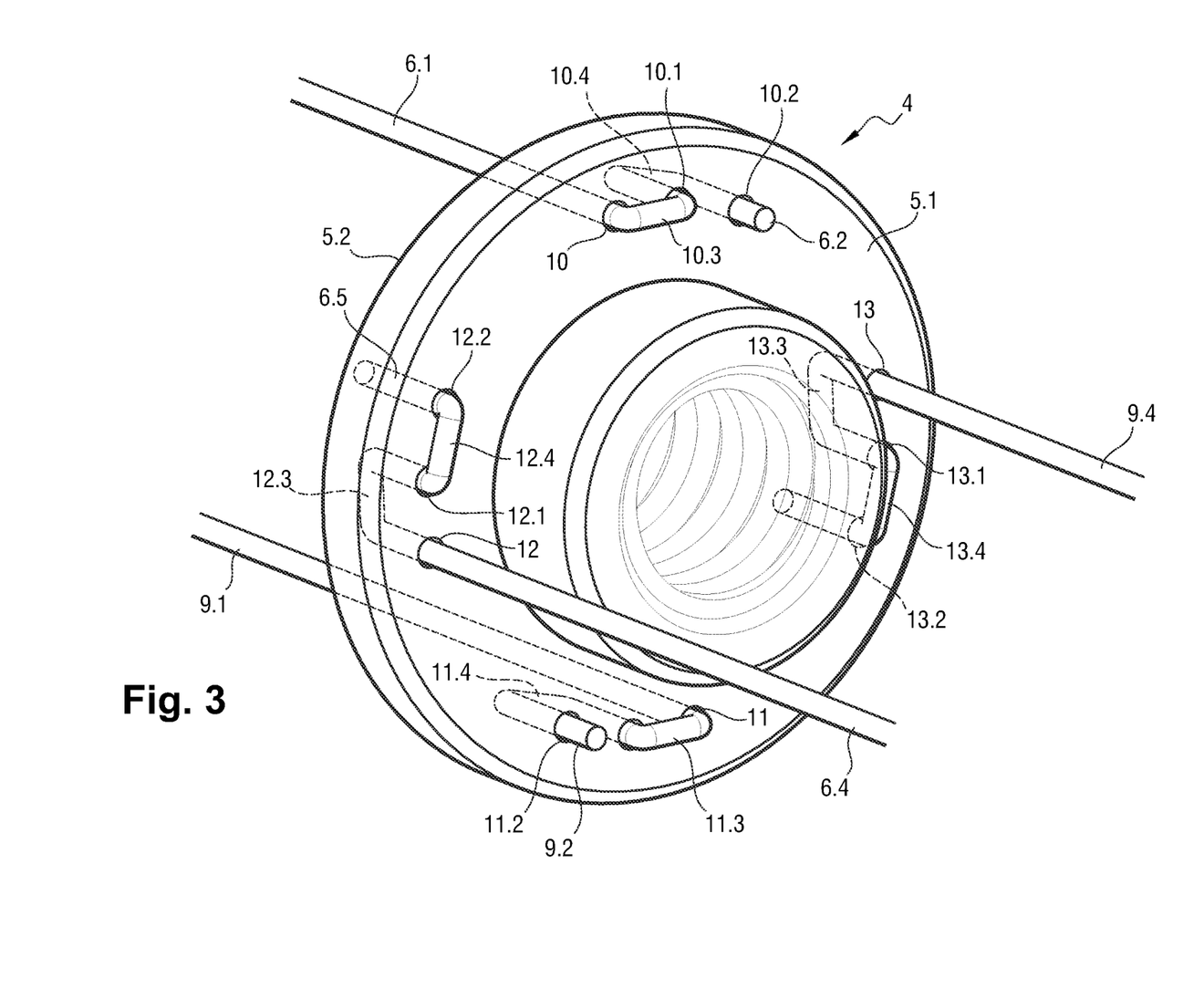
FIG. 3 is a view identical to the view of FIG. 2, showing a second embodiment of the invention.

In a second embodiment, and as shown in FIG. 3, the nut 4 has a fifth hole 10.1, a sixth hole 10.2, a seventh hole 11.1, an eighth hole 11.2, a ninth hole 12.1, a tenth hole 12.2, an eleventh hole 13.1, and a twelfth hole 13.2. The first hole 10, the fifth hole 10.1, the sixth hole 10.2, the second hole 11, the seventh hole 11.1, the eighth hole 11.2, the third hole 12, the ninth hole 12.1, the tenth hole 12.2, the fourth hole 13, the eleventh hole 13.1, and the twelfth hole 13.2 constitute a plurality of first holes.

The first cable strand 6.1 passes through the first hole 10 and runs along the first face 5.1 of the ring 5 to reach the fifth hole 10.1. Thereafter, the first cable strand 6.1 passes through the fifth hole 10.1 and runs along the second face 5.2 of the ring 5 to pass through the sixth hole 10.2. The first cable strand 6.1 thus forms a first segment 10.3 and a second segment 10.4 for blocking the first cable strand 6.1 in the ring 5. The first segment 10.3 and the second segment 10.4 act by friction to block the first cable strand 6.1 in the ring 5. Thus, the first cable strand 6.1 is coupled to the nut 4 by the first segment 10.3 and the second segment 10.4 of the first cable strand 6.1 passing through the first hole 10, the fifth hole 10.1, and the sixth hole 10.2.

Similarly, the second cable strand 9.1 passes through the second hole 11 and runs along the first face 5.1 of the ring 5 to reach the seventh hole 11.1. Thereafter, the second cable strand 9.1 passes through the seventh hole 11.1 and runs along the second face 5.2 of the ring 5 to pass through the eighth hole 11.2. The second cable strand 9.1 thus forms a third segment 11.3 and a fourth segment 11.4 for blocking the second cable strand 9.1 in the ring 5. The third segment 11.3 and the fourth segment 11.4 act by friction to block the second cable strand 9.1 in the ring 5. Thus, the second cable strand 9.1 is coupled to the nut 4 by the third segment 11.3 and the fourth segment 11.4 of the second cable strand 9.1 passing through the second hole 11, the seventh hole 11.1, and the eighth hole 11.2.

Similarly, the third cable strand 6.4 passes through the third hole 12 and runs along the second face 5.2 of the ring 5 in order to reach the ninth hole 12.1. Thereafter, the third cable strand 6.4 passes through the ninth hole 12.1, and runs along the first face 5.1 of the ring 5 to pass through the tenth hole 12.2. The third cable strand 6.4 thus forms a fifth segment 12.3 and a sixth segment 12.4 for blocking the third cable strand 6.4 in the ring 5. The fifth segment 12.3 and the sixth segment 12.4 act by friction to block the third cable strand 6.4 in the ring 5. Thus, the third cable strand 6.4 is coupled to the nut 4 by the fifth segment 12.3 and the sixth segment 12.4 of the third cable strand 6.4 passing through the third hole 12, the ninth hole 12.1, and the tenth hole 12.2.

Figure 4:
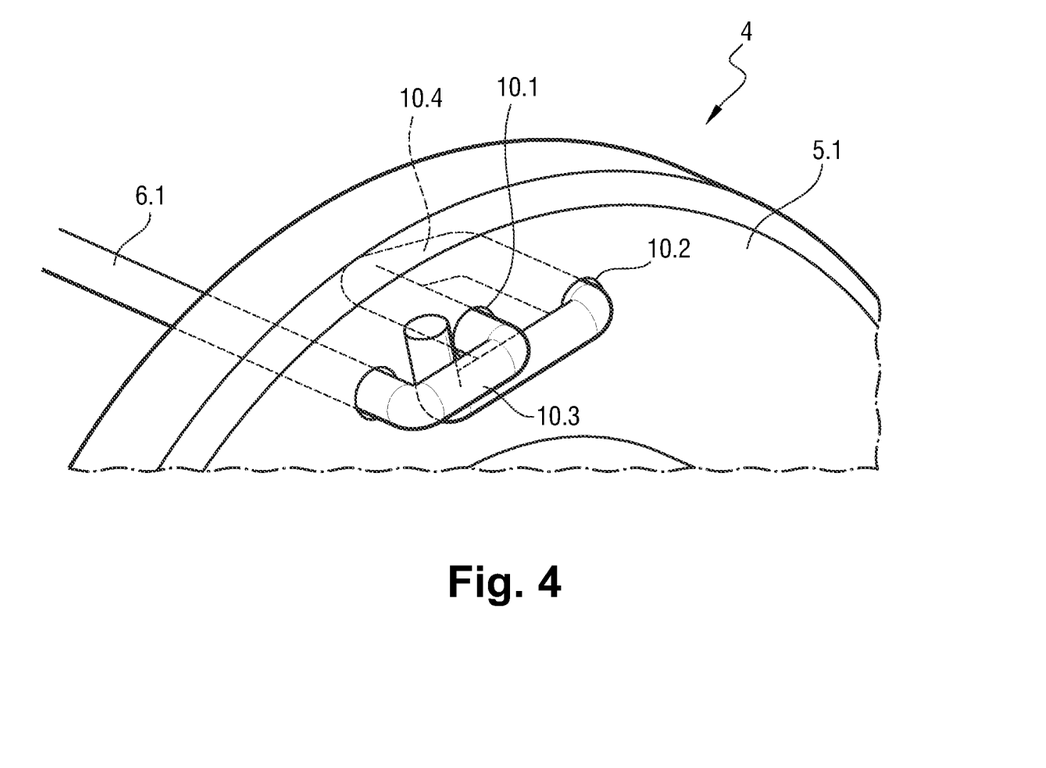
FIG. 4 is a view identical to the view of FIG. 2, showing a variant of the second embodiment of the invention.

Optionally, the first end 6.2 of the first cable strand 6.1 may be pinched between the first segment 10.3 and the first face 5.1 of the ring 5 (FIG. 4). A similar arrangement may also be used for the first end 9.2 of the second cable strand 9.1, for the first end 6.5 of the third cable 6.4, and for the first end 9.5 of the fourth cable 9.4.

Figure 5:
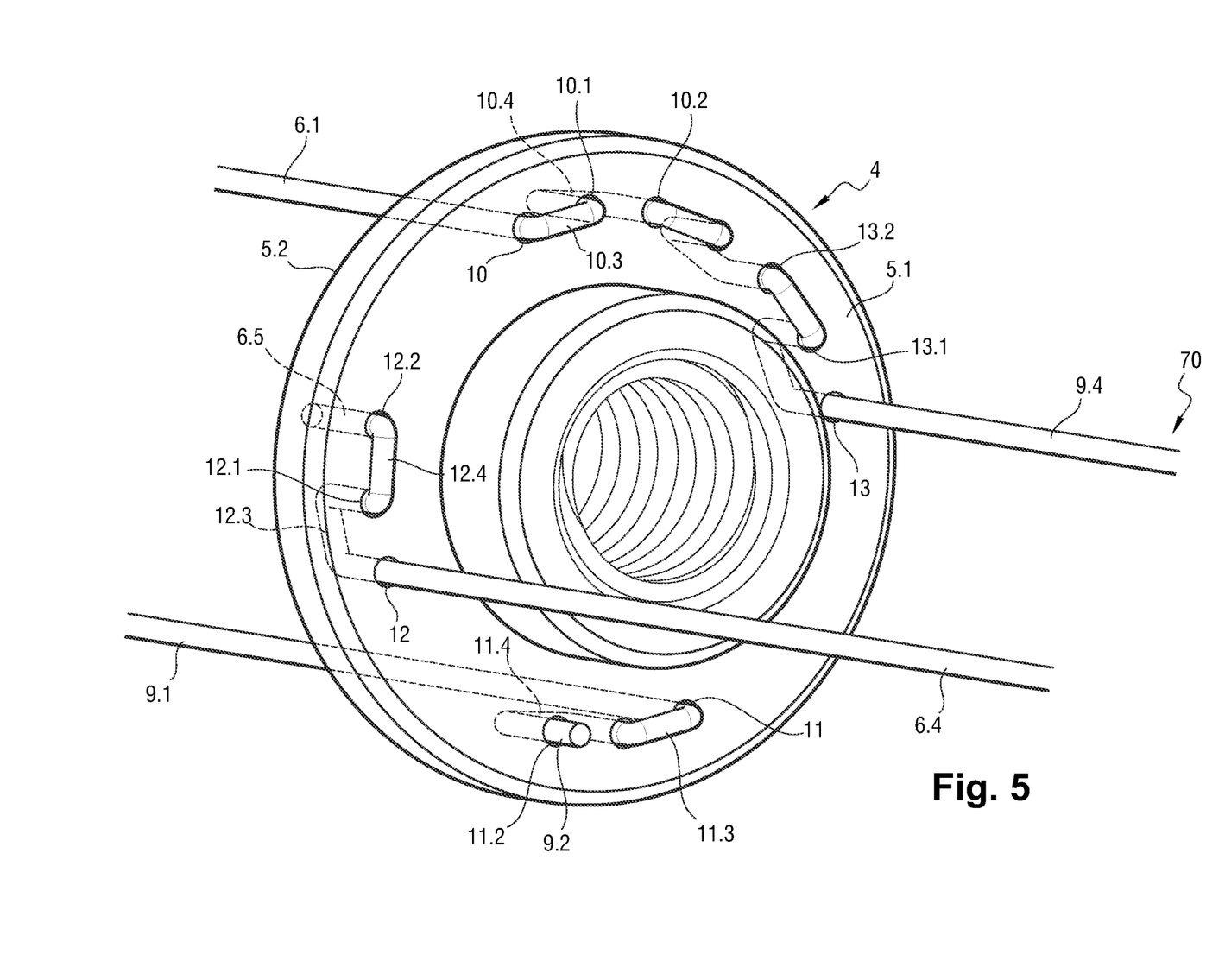
FIG. 5 is a view identical to the view of FIG. 2, showing a third embodiment of the invention.

In a third embodiment shown in FIG. 5, the first cable strand 6.1, on leaving the sixth hole 10.2, extends along the first face 5.1 to an additional thirteenth hole 10.5 in the ring 5. Thereafter, the first cable strand 6.1 passes through the twelfth hole 13.2 and extends along the second face 5.2 to penetrate into the twelfth hole 13.2, extend along the first face 5.1, penetrate into the eleventh hole 13.1, extend along the second face 5.2, and exit via the fourth hole 13 in order to extend to the second annular transverse face 34 of the tube 30. Thus, the first cable strand 6.1 and the fourth cable strand 9.4 form a single continuous cable 70.

In a fourth embodiment that is not shown, the first cable strand 6.1 and the second cable strand 9.1 form a single continuous cable 70. In a fifth embodiment that is not shown, the first cable strand 6.1 and the third cable strand 6.4 form a single continuous cable 70.

Figures 6, 7:
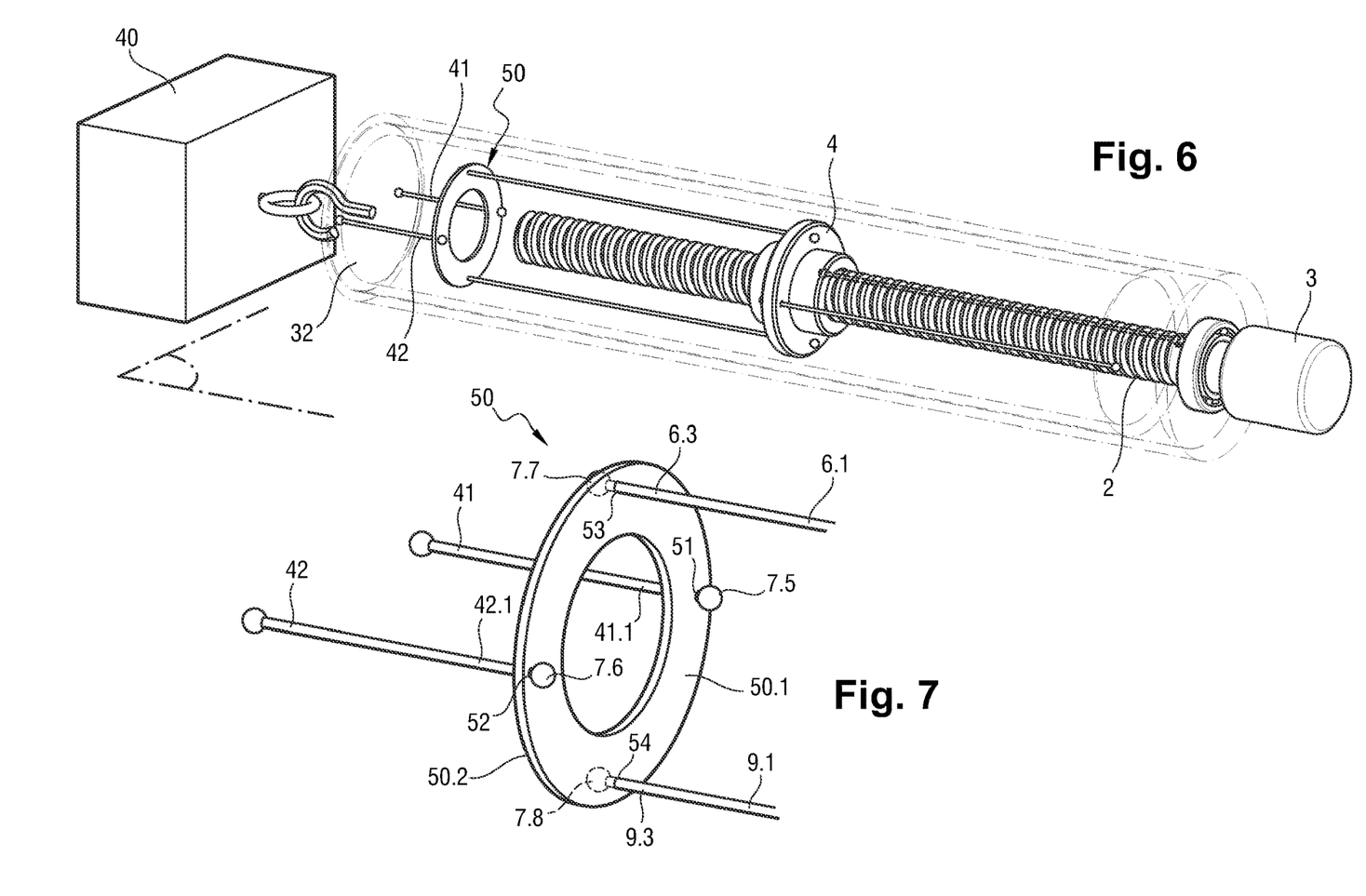
FIG. 6 is a perspective view of a cable actuator in a sixth embodiment of the invention.
FIG. 7 is a fragmentary diagrammatic view in perspective of a detail of FIG. 6.

In a sixth embodiment shown in FIGS. 6 and 7, a fifth cable strand 41 and a sixth cable strand 42 extend parallel to the first axis Ox between a first intermediate support 50 that is annular and the first transverse face 32 of the tube 30. The first end 41.1 of the fifth cable strand 41 is engaged through a fourteenth hole 51 of the first intermediate support 50 and has a fifth crimp 7.5 that bears against a first face 50.1 of the first intermediate support 50. The first end 42.1 of the sixth cable strand 42 is engaged through a fifteenth hole 52 of the first intermediate support 50 and has a sixth crimp 7.6 that bears against the first face 50.1 of the first intermediate support 50.

The second end 6.3 of the first cable strand 6.1 is engaged through a sixteenth hole 53 of the first intermediate support 50 and has a seventh crimp 7.7 that bears against the second face 50.2 of the first intermediate support 50. The second end 9.3 of the second cable strand 9.1 is engaged through a seventeenth hole 54 of the intermediate support 50 and has an eighth crimp 7.8 that bears against the second face 50.2 of the first intermediate support 50.

The fifth cable strand 41 and a sixth cable strand 42 extend on opposite sides of the first axis Ox in a fourth plane P4 containing the first axis Ox. The fourth plane P4 extends substantially orthogonally to the second plane P2.

Figure 8:
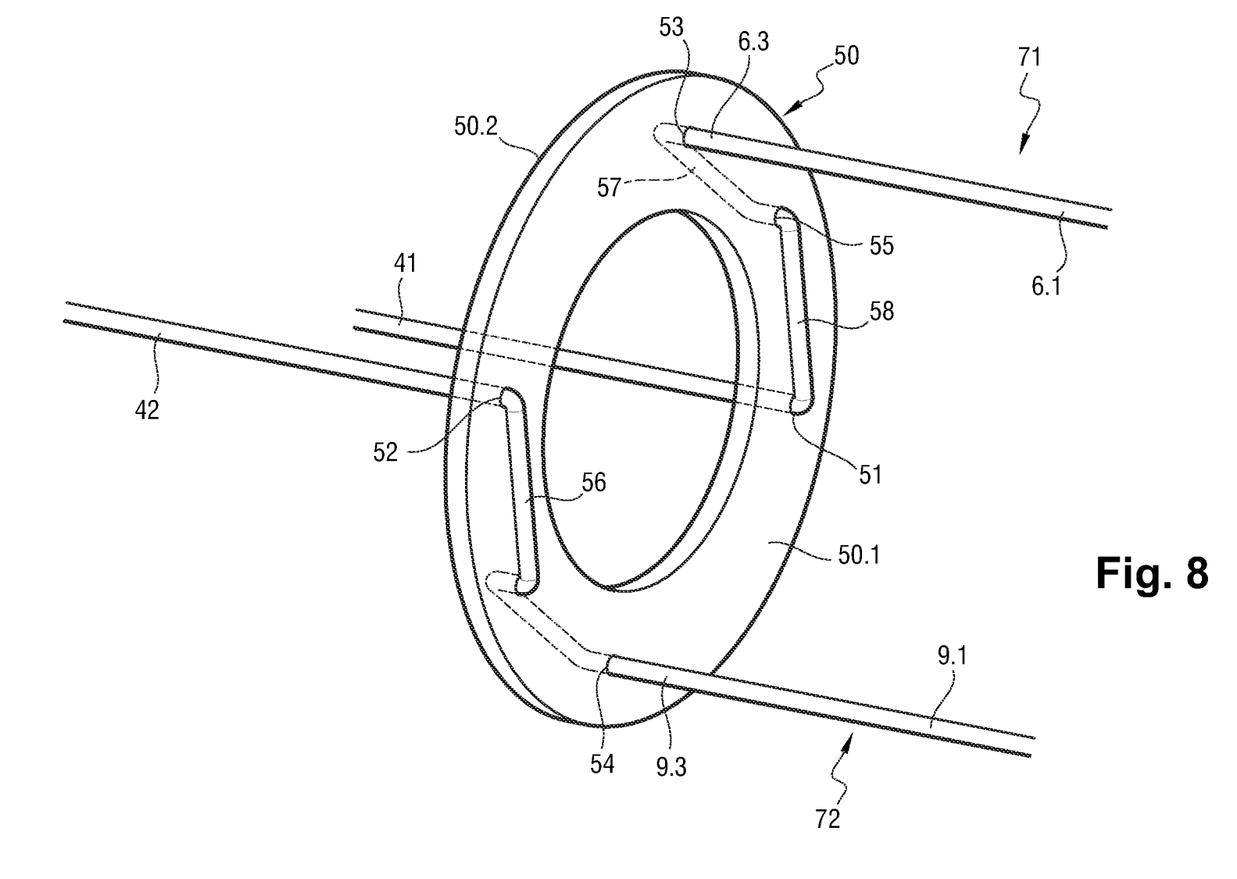
FIG. 8 is a view identical to the view of FIG. 2, showing a seventh embodiment of the invention.

As can be seen in FIG. 8, and in a seventh embodiment, the first intermediate support 50 has an eighteenth hole 55 situated between the fourteenth hole 51 and the sixteenth hole 53, and a nineteenth hole 56 situated between the fifteenth hole 52 and the seventeenth hole 54.

The fourteenth hole 51, the fifteenth hole 52, the sixteenth hole 53, the seventeenth hole 54, and the nineteenth hole 56 constitute a plurality of second holes.

The first cable strand 6.1 penetrates the sixteenth hole 53, extends along the second face 50.2 of the first intermediate support 50, and then engages in the eighteenth hole 55. On exiting the eighteenth hole 55, the first cable strand 6.1 extends along the first face 50.1 until it reaches the fourteenth hole 51, passes through the fourteenth hole 51, and extends to the first transverse face 32 of the tube 30. Thus, the first cable strand 6.1 and the fifth cable strand 41 form a single continuous cable 71. The first cable strand 6.1 thus forms a seventh segment 57 and an eighth segment 58 for blocking the first cable strand 6.1 in the first intermediate support 50. The seventh segment 57 and the eighth segment 58 then act by friction to block the first cable strand 6.1 in the first intermediate support 50.

The second cable strand 9.1 penetrates the seventeenth hole 54, extends along the second face 50.2 of the first intermediate support 50, and then engages in the nineteenth hole 56. On exiting the nineteenth hole 56, the second cable strand 9.1 extends along the first face 50.1 until it reaches the fifteenth hole 52, passes through the fourteenth hole 51, and extends to the first transverse face 32 of the tube 30. Thus, the second cable strand 9.1 and the sixth cable strand 42 form a single continuous cable 72.

Figure 9:
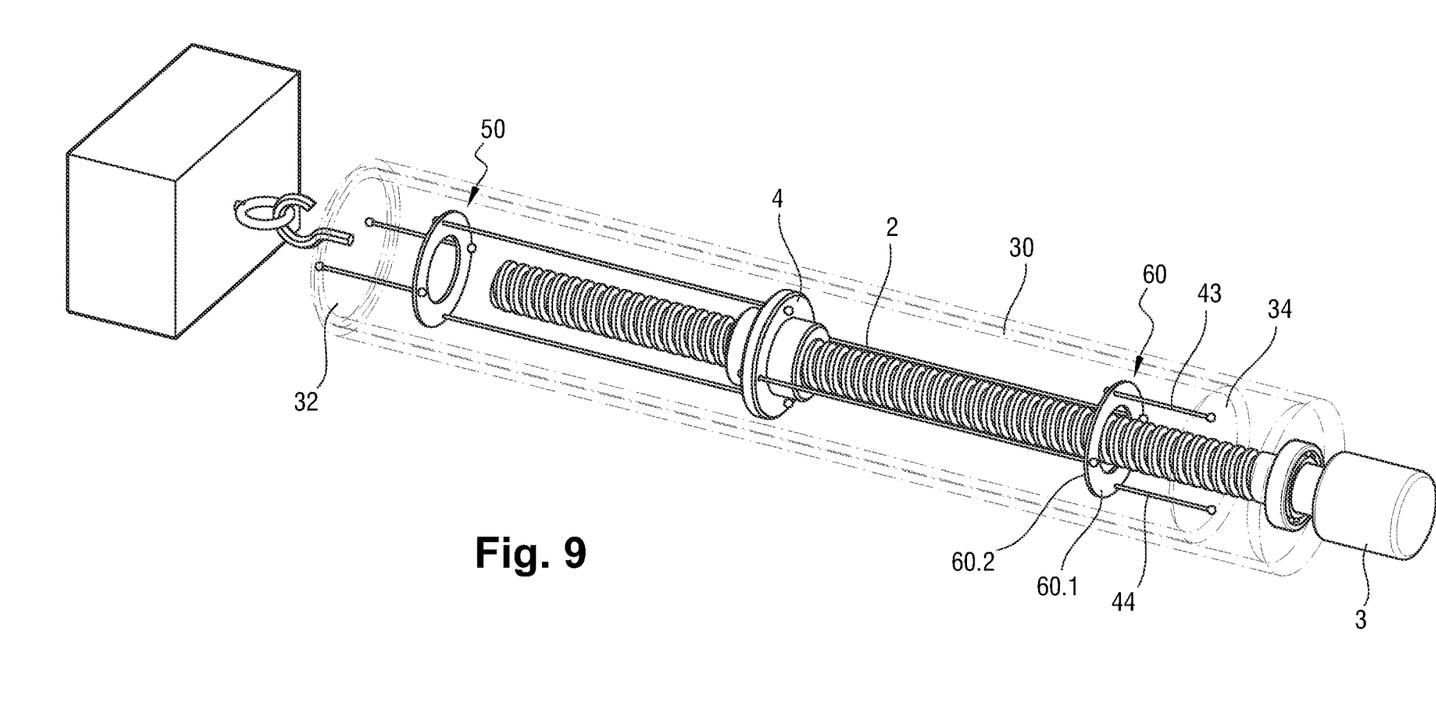
FIG. 9 is a perspective view of a cable actuator in an eighth embodiment of the invention.
Figure 10:
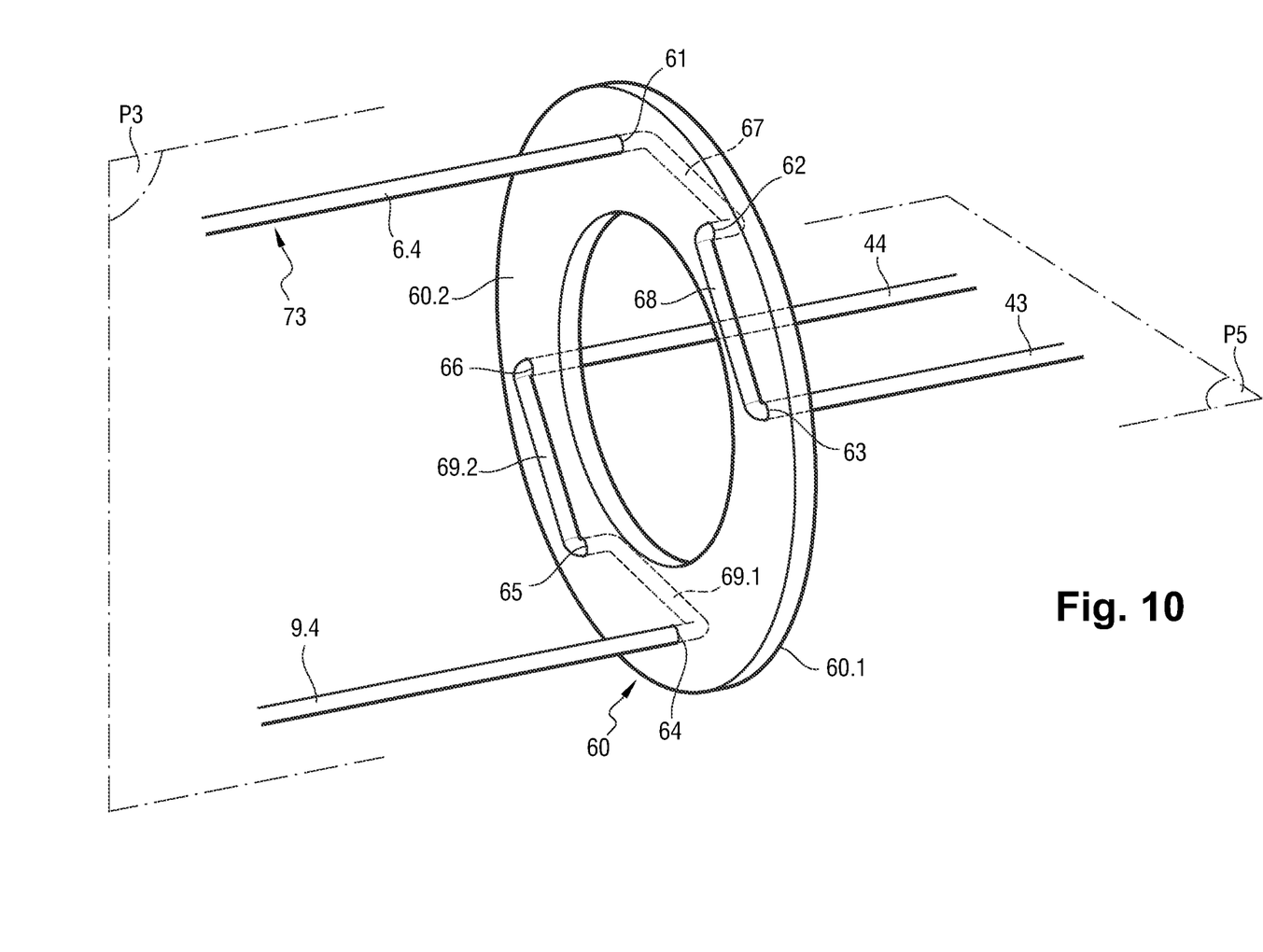
FIG. 10 is a view identical to the view of FIG. 2, showing a ninth embodiment of the invention.

In a ninth embodiment shown in FIGS. 9 and 10, a seventh cable strand 43 and an eighth cable strand 44 extend parallel to the first axis Ox between a second intermediate support 60 that is annular and a second transverse face 34 of the tube 30 opposite from the first transverse face 32.

The second intermediate support 60 has a twentieth hole 61, a twenty-first hole 62, a twenty-second hole 63, a twenty-third hole 64, a twenty-fourth hole 65, and a twenty-fifth hole 66. The twentieth hole 61, the twenty-first hole 62, the twenty-second hole 63, the twenty-third hole 64, the twenty-fourth hole 65, and the twenty-fifth hole 66 constitute a plurality of third holes.

The third cable strand 6.4 penetrates the twentieth hole 61, extends along a first face 60.1 of the second intermediate support 60, and then engages in the twenty-first hole 62. On exiting the twenty-first hole 62, the third cable strand 6.4 extends along the second face 60.2 until it reaches the twenty-second hole 63, to exit via the twenty-second hole 63 and extend to the second transverse face 34 of the tube 30. Thus, the third cable strand 6.4 and the seventh cable strand 43 form a single continuous cable 73. The third cable strand 6.4 thus forms a ninth segment 67 and a tenth segment 68 for blocking the third cable strand 6.4 in the second intermediate support 60. The ninth segment 67 and the tenth segment 68 act by friction to block the third cable strand 6.4 in the second intermediate support 60. The seventh cable strand 43 and the eighth cable strand 44 extend on opposite sides of the first axis Ox in a fifth plane P5 containing the first axis Ox. The fifth plane P5 extends substantially orthogonally to the third plane P3.

The fourth cable strand 9.4 penetrates the twenty-third hole 64, extends along the first face 60.1 of the second intermediate support 60, and then engages in the twenty-fourth hole 65. On exiting the twenty-fourth hole 65, the fourth cable strand 9.4 extends along the second face 60.2 until it reaches the twenty-fifth hole 66 to exit the twenty-fifth hole 66 and extend to the second transverse face 34 of the tube 30. Thus, the fourth cable strand 9.4 and the eighth cable strand 44 form a single continuous cable 74. The fourth cable strand 9.4 thus forms an eleventh segment 69.1 and a twelfth segment 69.2 for blocking the fourth cable strand 9.4 in the second intermediate support 60. The eleventh segment 69.1 and the twelfth segment 69.2 act by friction to block the fourth cable strand 9.4 in the second intermediate support 60.

Figure 11:
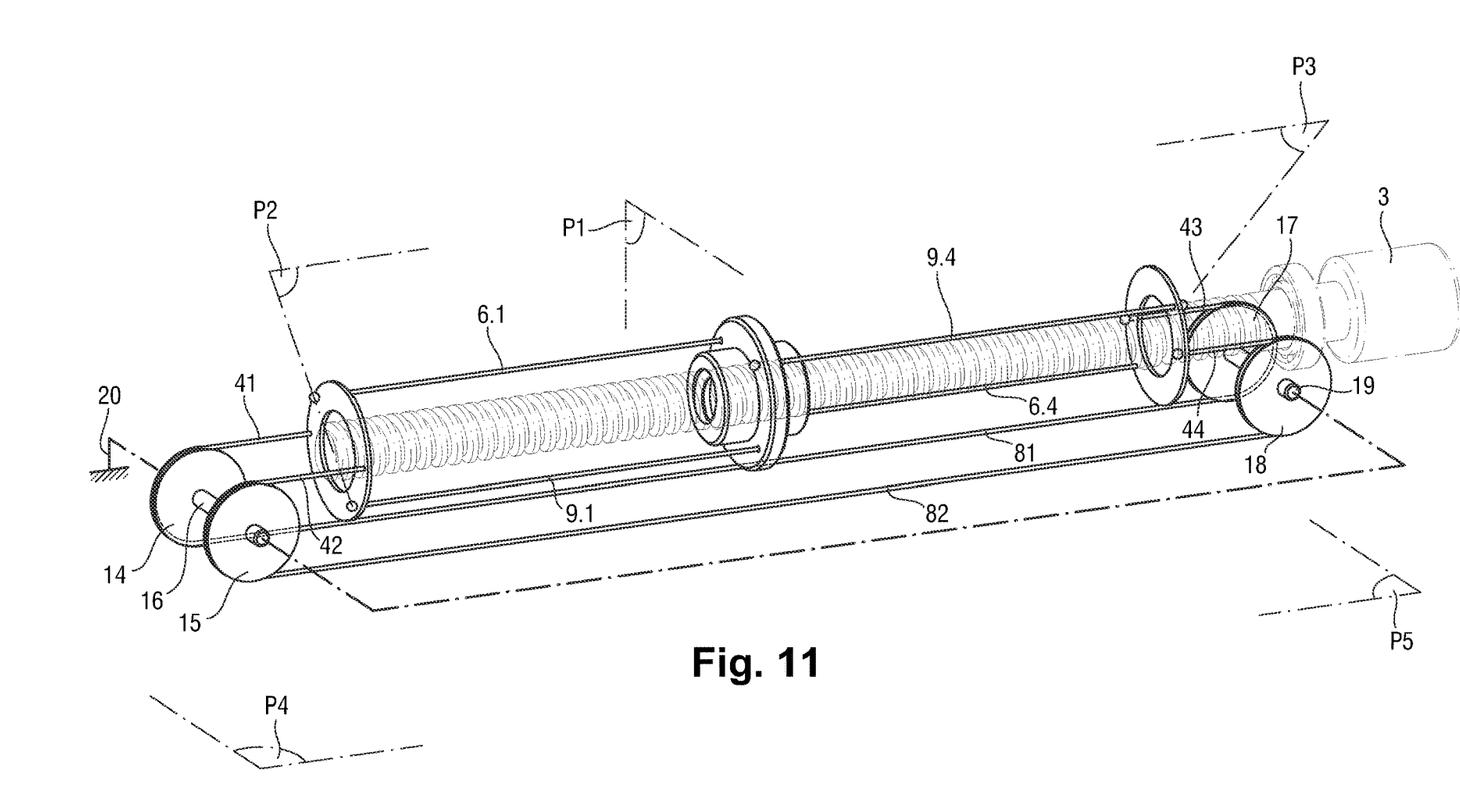
FIG. 11 is a perspective view of a cable actuator in a tenth embodiment of the invention.

In a tenth embodiment shown in FIG. 11, the actuator 100 has a first pulley 14 and a second pulley 15 secured to a first shaft 16 that is connected to the frame 20 and that extends parallel to the fourth plane P4. The actuator 100 also has a third pulley 17 and a fourth of pulley 18 secured to a second shaft 19 that is connected to the frame 20 and that extends in the fifth plane P5. In this particular embodiment, the second plane P2 and the third plane P3 are orthogonal. The fourth plane P4 forms an angle of 45° with the second plane P2, and the fifth plane P5 forms an angle of 45° with the third plane P3.

The fifth cable strand 41 and the seventh cable strand 43 are wound respectively around the first pulley 14 and around the third pulley 17. The fifth cable strand 41 and the seventh cable strand 43 join together on leaving the first pulley 14 and the third pulley 17 so as to form a first cable loop 81.

The sixth cable strand 42 and the eighth cable strand 44 are wound respectively around the second pulley 15 and around the fourth pulley 18. The sixth cable strand 42 and the eighth cable strand 44 join on leaving the second pulley 15 and the fourth pulley 18 to form a second cable loop 82. The first cable loop 81 and the second cable loop 82 are preloaded, e.g. by acting on the distance between the first shaft 16 and the second shaft 19.

Thus, an element that is constrained to rotate with the first shaft 16 or with the second shaft 19 may be driven in rotation by the electric motor 3.

Figure 12:
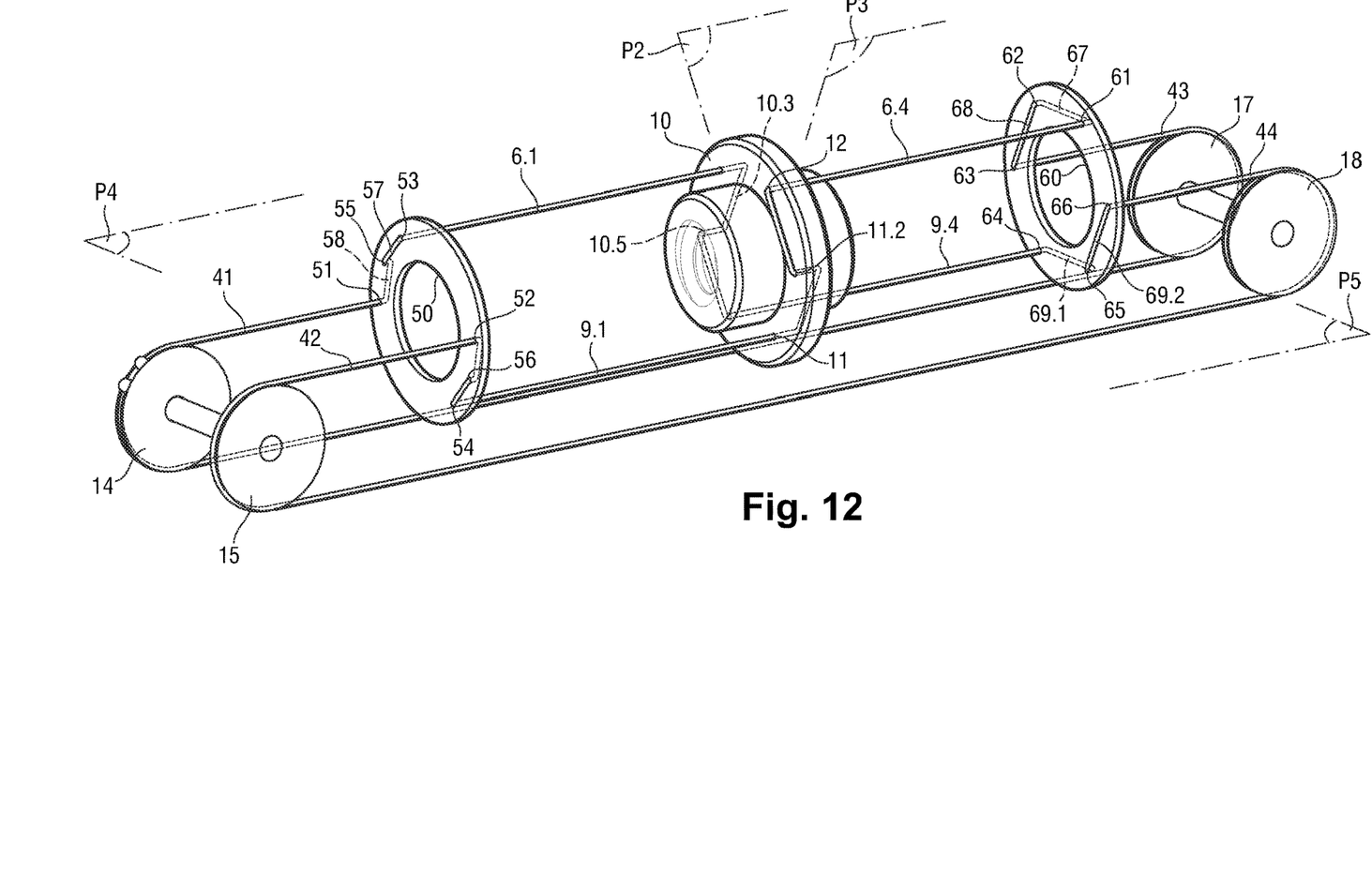
FIG. 12 is a perspective view of a cable actuator in an eleventh embodiment of the invention.

In an eleventh embodiment shown in FIG. 12, the second plane P2 and the third plane P3 form an angle of 60°. The fourth plane P4 forms an angle of 120° with the second plane P2, and the fifth plane P5 forms an angle of 120° with the third plane P3. A second end 41.2 of the fifth cable strand 41 is crimped to the first pulley 14 and extends to the first intermediate support 50. The fifth cable strand 41 is connected to the first intermediate support 50 by means of the eighth segment 58 that extends between the fourteenth hole 51 and the eighteenth hole 55 and also by means of the seventh segment 57 that extends between the eighteenth hole 55 and the sixteenth hole 53, and thereafter it joins the first cable strand 6.1. The first cable strand 6.1 is connected to the ring 5 by means of the first segment 10.3 that extends between the first hole 10 and the thirteenth hole 10.5 and also by means of the second segment 10.4 that extends from the thirteenth hole 10.5 to the fourteenth hole 13. The first cable strand 6.1 joins the fourth cable strand 9.4, which extends from the ring 5 to the second intermediate support 60. The fourth cable strand 9.4 is connected to the second intermediate support 60 by means of the eleventh segment 69.1 that extends between the twenty-third hole 64 and the twenty-fourth hole 65 and by means of the twelfth segment 69.2 that extends between the twenty-fourth hole 65 and the twenty-fifth hole 66. The fourth cable strand 9.4 joins the eighth cable strand 44, which winds around the fourth pulley 18 and then extends substantially parallel to the first axis Ox in order to wind around the second pulley 15. On exiting the second pulley 15, the eighth cable strand 44 joins the sixth cable strand 42, which extends to the first intermediate support 50. The sixth cable strand 42 is connected to the first intermediate support 50 by means of the cable segment that extends between the fifteenth hole 52 and the nineteenth hole 56 and also by means of the cable segment that extends from the nineteenth hole 56 to the seventeenth hole 54. The sixth cable strand 42 joins the second cable strand 9.1, which extends from the first intermediate support 50 to the ring 5. The second cable strand 9.1 is connected to the ring 5 by means of the cable segment that extends between the second hole 11 and the eighteenth hole 11.2 and by means of the cable segment that extends between the eighteenth hole 11.2 and the third hole 12. The second cable strand 9.1 joins the third cable strand 6.4, which extends from the ring 5 to the second intermediate support 60. The third cable strand 6.4 is connected to the second intermediate support 60 by means of the ninth segment 67 that extends between the twentieth hole 61 and the twenty-first hole 62 by means of the tenth segment 68 that extends between the twenty-first hole 62 and the twenty-second hole 63. The third cable strand 6.4 joins the seventh cable strand 43, which winds around the third pulley 17 and then extends substantially parallel to the first axis Ox to wind around the second pulley 15 on which the seventh cable strand is crimped.

Thus, the first cable strand 6.1, the second cable strand 9.1, the third cable strand 6.4, the fourth cable strand 9.4, the fifth cable strand 41, the sixth cable strand 42, the seventh cable strand 43, and the eighth cable strand 44 form a single continuous cable.

In all of the embodiments described, the first cable strand 6.1, the second cable strand 9.1, the third cable strand 6.4, the fourth cable strand 9.4, the fifth cable strand 41, the sixth cable strand 42, the seventh cable strand 43, and the eighth cable strand 44 are advantageously preloaded.

Naturally, the invention is not limited to the embodiments described, but covers any variant coming within the ambit of the invention as defined by the claims.

In particular:
  although above, the first, second, third, and fourth cable strands are coupled to the nut at equal distances from the first axis, the invention applies equally to other configurations for the points where the strands are coupled to the nut, e.g. such as a first and second strand coupled on the nut at the same first distance that is different from a second distance between the points where the third and fourth cables are coupled. The distance between the first axis and the coupling points of the first and second cable strands are preferably equal, as are the distances between the first axis and the coupling points of the third and fourth cable strands;
  although above, the frame is cylindrical in shape, the invention applies equally well to frames of other shapes, e.g. such as a plate, a square tube, or any arbitrary shape;
  although above, the axis of the screw extends horizontally, the invention applies equally well to the axis of rotation of the screw having other orientations, e.g. such as an orientation that is vertical, at 45°, or at any angle;
  although above, the actuator includes a ball screw, the invention applies equally well to other types of screw, e.g. such as a screw with plain threads or a roller screw;
  although above, the first cable is coupled to the nut by a crimp blocked by a hole made in a ring that is secured to the nut, the invention applies equally to other means for coupling a cable to the nut, e.g. such as a crimp in an eyelet secured to the nut or a crimp in a hole made in the nut;
  although above, the cables extend parallel to the first axis, the invention applies equally to other configurations for the cables in which no cable portion or only one cable portion extends parallel to the first axis, the remainder of the cable potentially adopting an arbitrary orientation relative to the first axis;
  although the first and second pulleys are secured to the same shaft, the invention applies equally well to pulleys mounted on independent shafts;
  although above, all of the cables of the actuator are preloaded, the invention applies equally to a single cable being preloaded onto only a fraction of the cables being preloaded;
  although above, the third plane is orthogonal to the second plane, the invention applies equally to other relative orientations for the second and third planes, such as for example a second plane and a third plane forming an angle of 45° or of 60°, or an angle of some other value lying in the range 0° to less than 180°. The second and third planes may be parallel to each other;
  although above, the fourth plane is orthogonal to the second plane, the invention applies equally to other relative orientations for the second and fourth planes, such as for example a second plane and a fourth plane forming an angle of 45° or of 60°, or an angle of some other value lying in the range 0° to less than 180°. The second and fourth planes may be parallel to each other;
  although above, the fifth plane is orthogonal to the third plane, the invention applies equally to other relative orientations for the third and fifth planes, such as for example a third plane and a fifth plane forming an angle of 45° or of 60°, or an angle of some other value lying in the range 0° to less than 180°. The third and fifth planes may be parallel to each other;
  although above, the first, second, third, fourth, and fifth planes all include the first axis, the invention applies equally to one or more of the first to fifth planes not including the first axis;
  although above, the plurality of first holes comprises twelve holes, the invention applies equally to a nut having two to eleven holes or more than twelve holes;
  although above, the plurality of second holes comprise five holes, the invention applies equally to a first intermediate support having two to four holes or more than five holes;
  although above, the plurality of third holes comprise seven holes, the invention applies equally to a second intermediate support having two to six holes or more than seven holes;
  although above, the first cable strand forms two segments passing through the nut, the invention applies equally to a cable strand forming a single segment for fastening it to the nut, to the first intermediate support, or to the second intermediate support. It is also possible to combine the solutions for fastening the cables while retaining the advantages of the invention, and to have one cable strand that is crimped and another cable strand that is connected by means of a blocking segment passing through two holes.

The invention claimed is:
1. A cable actuator comprising:
a frame;
a screw mounted on the frame and extending along a first axis;
a nut co-operating with the screw;
a motor arranged to drive the screw in rotation;

a first cable strand and a second cable strand coupled directly to the nut and extending on a first side of a first plane orthogonal to the first axis and containing the nut, the first cable strand and the second cable strand extending in a second plane;

a third cable strand and a fourth cable strand coupled directly to the nut and extending on a second side of the first plane, the third cable strand and the fourth cable strand extending in a third plane;

the first plane subdivides the second plane into a first half-plane in which the first cable strand and the second cable strand extend, and into a second half-plane not having any cable strands that are directly connected to the nut;

the first plane subdivides the third plane into a third half-plane in which the third cable strand and the fourth cable strand extend, and into a fourth half-plane not having any cable strands that are directly connected to the nut;

the second plane and the third plane being distinct; and the first cable strand and/or the second cable strand and/or the third cable strand and/or the fourth cable strand being functionally connected to an element that is to be moved.

2. A cable actuator according to claim 1, wherein the nut has a plurality of first holes, and the first cable strand and/or the second cable strand and/or the third cable strand and/or the fourth cable strand are coupled to the nut by at least one segment passing through a pair of first holes.

3. A cable actuator according to claim 2, wherein the first cable strand and the second cable strand or the third cable strand or the fourth cable strand form a single first continuous cable.

4. A cable actuator according to claim 1, wherein the first axis extends in the second plane and/or in the third plane.

5. A cable actuator according to claim 1, wherein the second plane and the third plane are orthogonal.

6. A cable actuator according to claim 1, wherein the second plane and the third plane form an angle of 60°.

7. A cable actuator according to claim 1, including a first pulley, a second pulley, a third pulley, and a fourth pulley that are functionally connected to the nut.

8. A cable actuator according to claim 1, wherein the first cable strand and the second cable strand extend between the nut and a first intermediate support that is connected to the element that is to be moved functionally by means of a fifth cable strand and of a sixth cable strand.

9. A cable actuator according to claim 7, wherein the fifth cable strand extends between the first pulley and the first intermediate support, and the sixth cable strand extends between the second pulley and the first intermediate support.

10. A cable actuator according to claim 8, wherein the first intermediate support includes a plurality of second holes, and the first cable strand and/or the second cable strand is/are coupled to the first intermediate support by at least one segment passing through a pair of second holes.

11. A cable actuator according to claim 9, wherein the first intermediate support includes a plurality of second holes, and the fifth cable strand and/or the sixth cable strand is/are coupled to the first intermediate support by at least one segment passing through a pair of second holes.

12. A cable actuator according to claim 9, wherein the fifth cable strand and the sixth cable strand extend in a fourth plane.

13. A cable actuator according to claim 12, wherein the fourth plane and the second plane form an angle of 45° or of 60°.

14. A cable actuator according to claim 1, wherein the third cable strand and the fourth cable strand extend between the nut and a second intermediate support that is functionally connected to the element that is to be moved.

15. A cable actuator according to claim 7, wherein a seventh cable strand extends between the third pulley and the second intermediate support, and an eighth cable strand extends between the fourth pulley and the second intermediate support.

16. A cable actuator according to claim 14, wherein the second intermediate support includes a plurality of third holes, and the third cable strand and/or the fourth cable strand is/are coupled to the second intermediate support by at least one segment passing through a pair of third holes.

17. A cable actuator according to claim 15, wherein the second intermediate support includes a plurality of third holes, and the seventh cable strand and/or the eighth cable strand is/are coupled to the second intermediate support by at least one segment passing through a pair of third holes.

18. A cable actuator according to claim 15, wherein the seventh cable strand and the eighth cable strand extend in a fifth plane.

19. A cable actuator according to claim 18, wherein the fifth plane and the third plane form an angle of 45° or of 60°.

20. A cable actuator according to claim 19, wherein the third cable strand and the seventh cable strand or the eighth cable strand form a single continuous cable.

21. An actuator according to claim 7 wherein the third cable strand and the fourth cable strand extend between the nut and a second intermediate support that is functionally connected to the element that is to be moved;

the cable actuator including a first pulley and a second pulley connected respectively by a fifth cable strand and by a sixth cable strand to the first intermediate support, and also a third pulley and a fourth pulley connected respectively by a seventh cable strand and by an eighth cable strand to the second intermediate support;

the fifth cable strand and the sixth cable strand extending in a fourth plane;

the seventh cable strand and the eighth cable strand extending in a fifth plane;

the nut including a plurality of first holes, the first support including a plurality of second holes;

the second support including a plurality of third holes; and the first cable strand, the second cable strand, the third cable strand, the fourth cable strand, the fifth cable strand, the sixth cable strand, the seventh cable strand, and the eighth cable strand form a single continuous cable coupled to the nut by at least one segment passing through a pair of first holes, the single cable also being coupled to the first support by at least one segment passing through a pair of second holes, the single cable also being coupled to the second support by at least one segment passing through a pair of third holes.

22. A cable actuator according to claim 1, wherein the first cable strand and/or the second cable strand and/or the third cable strand and/or the fourth cable strand is/are coupled to the nut by crimping.

23. An actuator according to claim 1, wherein any one of the cable strands is preloaded.

24. An actuator according to claim 1, wherein a first distance between the first cable strand and the first axis is different from a second distance between the third cable strand and/or the fourth cable strand and the first axis.

* * * * *